United States Patent [19]
Åhlen et al.

[11] Patent Number: 5,438,495
[45] Date of Patent: Aug. 1, 1995

[54] EMBEDDED LIGHT FITTING FOR RUNWAYS

[75] Inventors: Hans Åhlen, Vällingby; Leif Ek, Bandhagen, both of Sweden

[73] Assignee: Airport Technology In Scandinavia AB, Froson, Sweden

[21] Appl. No.: 778,810

[22] PCT Filed: Jun. 14, 1990

[86] PCT No.: PCT/SE90/00416
§ 371 Date: Jan. 24, 1992
§ 102(e) Date: Jan. 24, 1992

[87] PCT Pub. No.: WO90/15954
PCT Pub. Date: Dec. 27, 1990

[30] Foreign Application Priority Data
Jun. 16, 1989 [SE] Sweden .................... 8902177

[51] Int. Cl.[6] .................................... F21V 13/04
[52] U.S. Cl. .......................... 362/153.1; 362/299; 362/301; 362/364
[58] Field of Search .......... 362/153.1, 298, 299, 362/300, 301, 302, 346, 364

[56] References Cited

U.S. PATENT DOCUMENTS

| | | | |
|---|---|---|---|
| 1,223,752 | 4/1917 | Adams | 362/302 |
| 1,406,648 | 2/1922 | Ingols | 362/298 |
| 1,408,306 | 2/1922 | Melanson | 362/298 |
| 1,463,623 | 7/1923 | McCarthy | 362/299 |
| 1,601,293 | 9/1926 | Cathrill | 362/298 |
| 1,799,321 | 4/1931 | Ring | 362/298 |
| 5,142,387 | 8/1992 | Shikama et al. | 362/298 |

*Primary Examiner*—Richard R. Cole
*Attorney, Agent, or Firm*—Townsend and Townsend Khourie and Crew

[57] ABSTRACT

A light fitting, preferably intended to be embedded in the surfacing of a runway, includes a light source (2) with a reflector (1) as well as a limiting light opening in the field of light. A mirror device is arranged for reflecting a part of the field of light (4) back towards the reflector (1) for sending this light through the light opening (3) after further reflection.

4 Claims, 4 Drawing Sheets

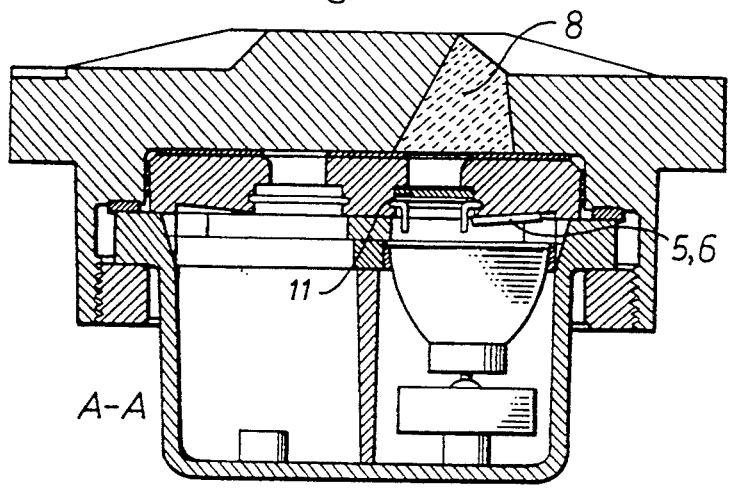
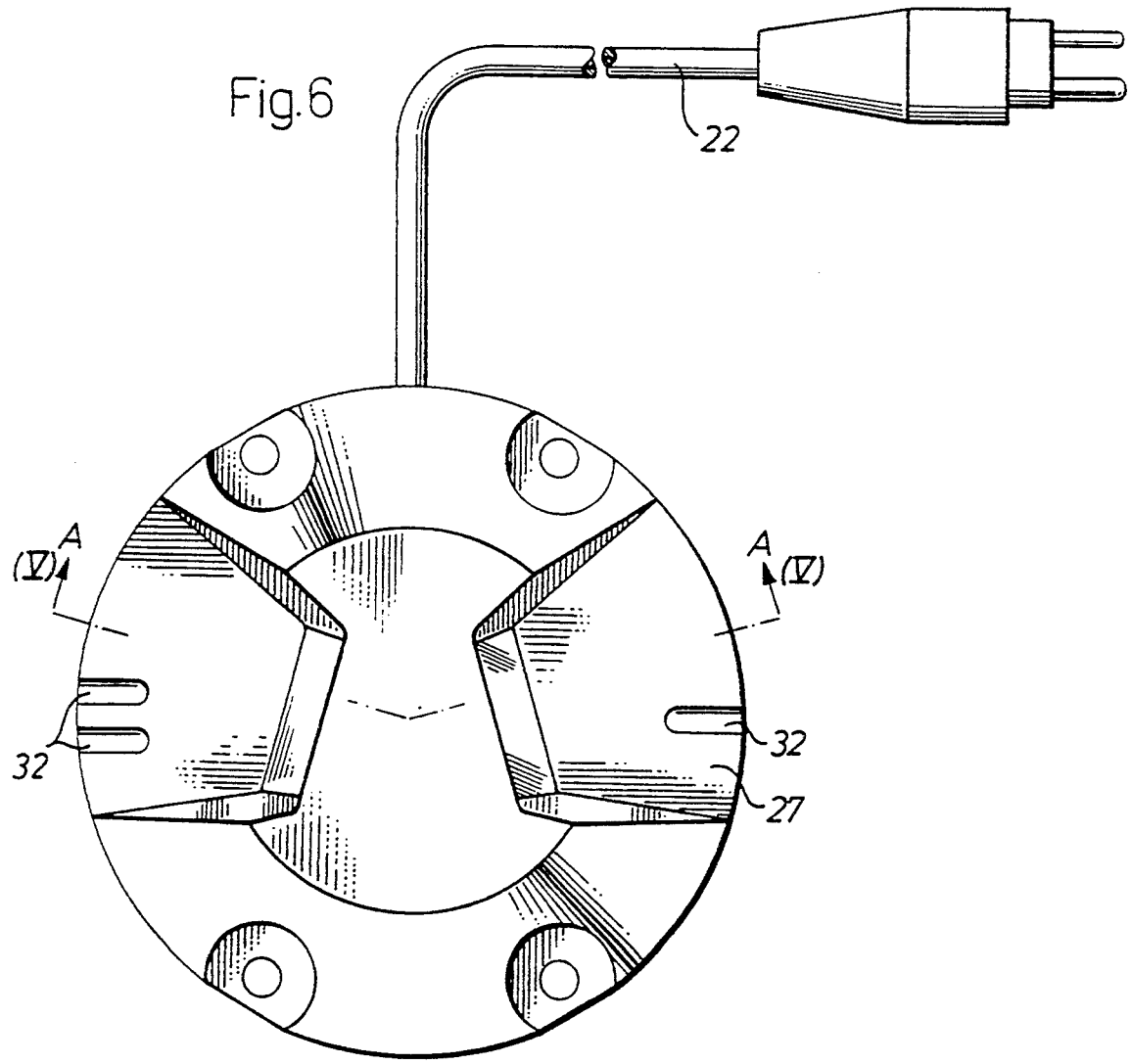

EMBEDDED LIGHT FITTING FOR RUNWAYS

BACKGROUND OF THE INVENTION

The present invention relates to a light fitting, preferably intended to be embedded in a runway surfacing and including a light source with a reflector as well as limiting light opening in the field of light.

When implementing embedded airport lights it is important from the safety aspect that the fitting does not project too far above the runway surfacing. At the same time there is the requirement that the light shall be visible from a long distance, also in poor weather (fog, eddying snow etc.) or strong sunlight. Nearly all such embedded air port lights have a slit-shaped light opening to meet the mentioned conditions.

The object of the present invention is to provide a light fitting of the kind mentioned in the introduction, in which the efficiency increased so that the dimensions and weight of the fitting can be reduced.

This object is achieved with a fitting having a reflector having a field of light and a mirror device arranged for reflecting a part of the field of light back towards the reflector. The part of the light is reflected a second time off the reflector and is thereafter directed through the light opening.

The present invention thus relates to a construction which considerably increases the efficiency of light fittings embeded in the surfacing of a runway, signifying that the dimensions of the fittings can be reduced considerably, simultaneously as the light projection from the fitting will be wider and more uniform.

BRIEF DESCRIPTION OF THE DRAWINGS

FIG. 5 is a cross section of a practical embodiment of unidirectional fitting in accordance with the invention, and FIG. 6 is a view from above of an exemplifying embodiment of the fitting in accordance with the invention, intended for use as curve light.

DESCRIPTION OF THE PREFERRED EMBODIMENTS

Figure 1:
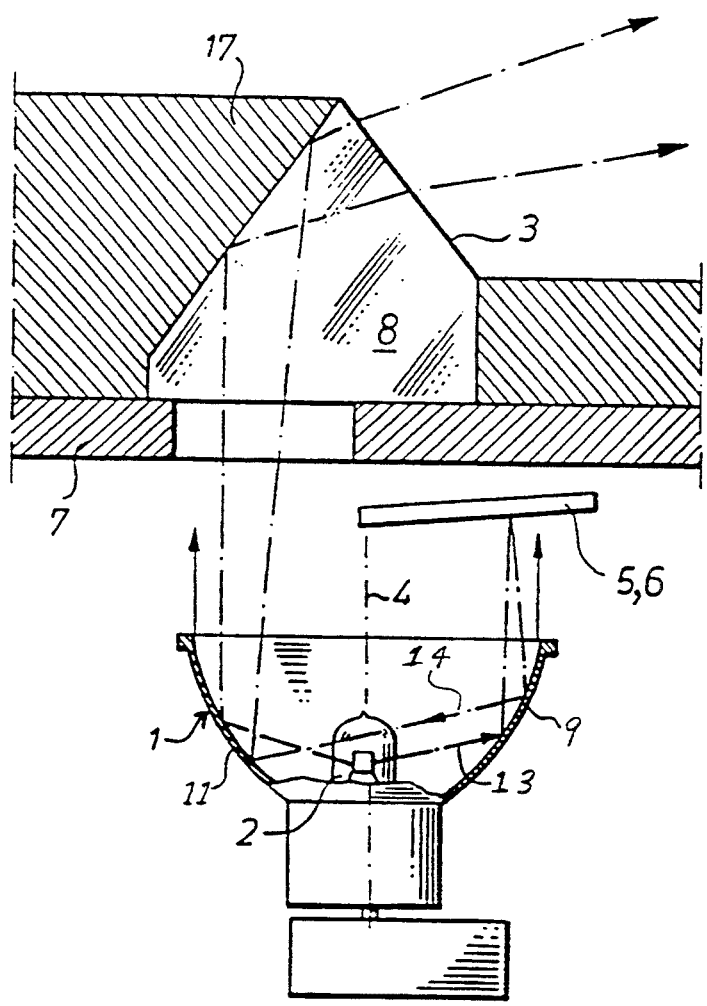
FIGS. 1 and 2 schematically illustrate two exemplifying embodiments of the fitting according to the invention.
Figure 2:
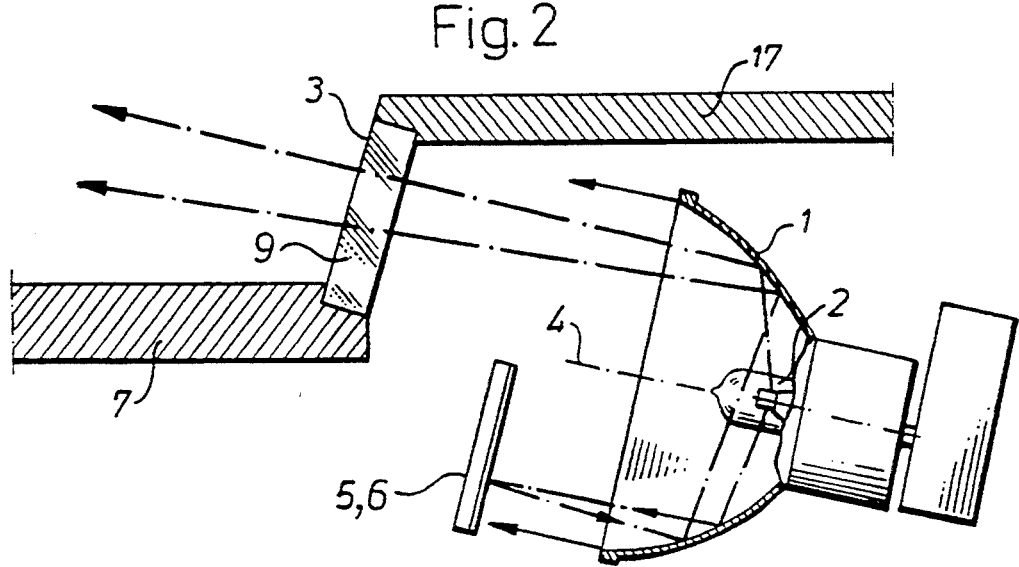

It will be seen from FIGS. 1 and 2 that the fitting includes a lamp with a light source 2 arranged in a reflector 1 reflecting the light from the light source 2.

A preferably slit-shaped light opening 3 is arranged in the casing 7 of the fitting. The lamp is placed so that the light opening will be situated in the light field 4.

To increase the efficiency, a mirror device 5, 6 is arranged in front of the lamp for reflecting a part of the light field 4 which otherwise would not pass through the light opening 3 and consequently would not be utilized. The mirror device reflects this part of the light field back towards the light source 2 or immediately beside it, and after further reflection in the lamp reflector 1, this light is also emitted through the light opening 3.

The reflector 1 has a first side 9 and a second side 11. Referring to FIG. 1, the first side 9 reflects a first portion 13 of the light from the light source 2. The mirror device 5, 6 is positioned to receive the first portion of light 13 reflected by the first side 9 of the reflector 1. The mirror device 5, 6 is configured to reflect the first portion of light 13 back toward the first side 9 of the reflector 1 so that the first portion of light 13 is reflected a second time off the first side 9. The second reflection of the first portion of light 13 is denoted with reference number 14. The first portion of light which is reflected off the first side the second time is directed toward the second side and is thereafter reflected off the second side toward the light opening 3.

Accordingly the light from the lamp will be more effectively utilized, and its efficiency will consequently increase. Practical experiments have shown an increase of 25% in the light yield in the embodiment according to the invention. A more uniform light distribution has also been noted, The mirror device 5, 6 is suitably somewhat angled or curved for improving its function (it is shown flat in the Figures), and the mirror device preferably includes two flat mirrors provided in a mutual angular relationship (FIG. 8). Further the mirror device is included at preferably 3° inwardly towards the center of the fitting.

The fitting is enclosed in a metal casing to be embedded in a well e.g. in a runway. The casing part 17 projects somewhat above the surface of the runway, and the light opening 3 is closed with a prism 8 in the embodiment according to FIG. 1 and with a glass plate 9 in the embodiment according to FIG. 2.

In both cases the requirement is that there shall be a substantially rectangular, light beam departing from the fitting substantially along the surface of the runway, The light source 2 is preferably a halogen lamp and the reflector 1 suitably a so-called cold light reflector, i.e. it comprises several layers which by interference block certain frequencies and transmit others. In this way heat is dissipated directly to the surroundings of the reflector 1.

Figure 3:
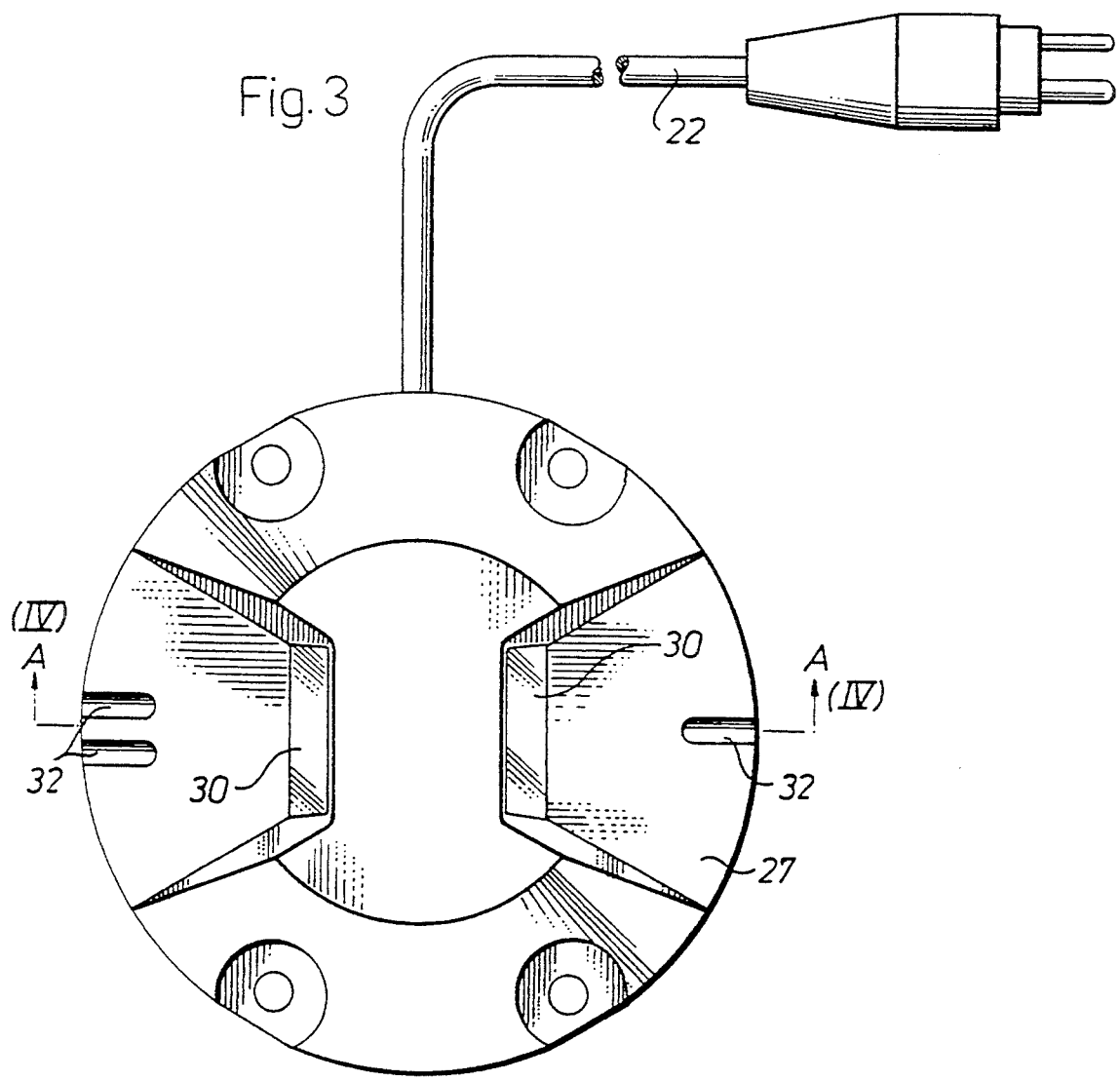
FIGS. 3 and 4 show a view from above and in cross section, respectively, of a practical embodiment of a bidirectional fitting in accordance with the invention.

In FIG. 3 there is shown from above a practical embodiment of a bidirectional fitting for marker lights intended for straight portions of the runway at an airport, The fitting is accordingly formed with two diametrically opposing, slit-like light openings 30 made in the casing 27. The connection cable 22 of the fitting is also shown in the Figure. There are also guide slits 32 made in the casing 27 for co-action with complementary means in the fitting well during installation for avoding incorrect orientation of the fitting.

Figure 4:
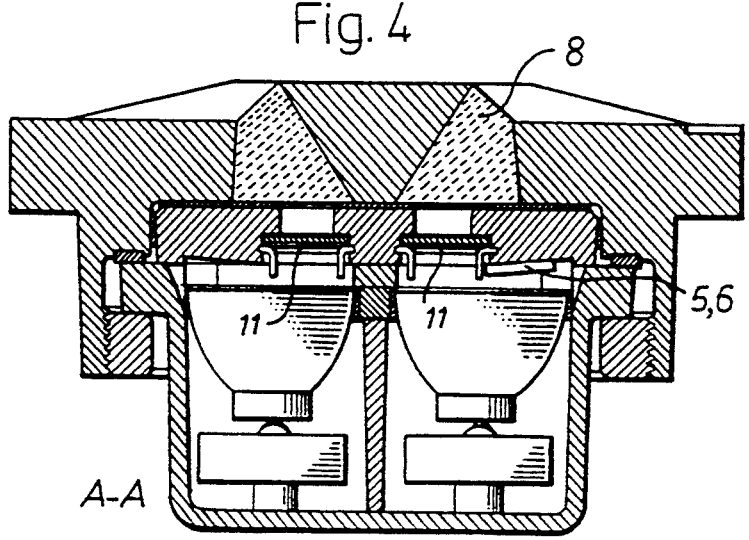

In FIG. 4, the fitting of FIG. 3 is illustrated in a longitudinal section along the plane A—A. A colour filter is illustrated at 11 disposed in the light field. The filter can be e.g. green for a straight stretch and curves, yellow for crossings and red for so-called stop bars.

In FIG. 5 there is illustrated an embodiment in which only one half of a fitting of the kind illustrated in FIG. 4 is utilized to provide a unidirectional fitting.

FIG. 6 illustrates an embodiment of the fitting for use as curve lights, the slit-like light openings 30 being in mutual angular relationship.

By utilizing re-reflected light, smaller lamps can be used and the dimensions of the fitting be reduced, as mentioned. The casing of the fitting is suitably made of aluminium, which material is advantageous from the point of view of weight as well as from heat conduction and corrosion view point.

Although the fitting in accordance with the invention has been described for applicaitons at airports, it can obviously be used for other applications where a light embedded in the surfacing of a runway or the like is required.

We claim:

1. A light fitting adapted to be embedded in the surface of a runway, comprising:
   a light source having a field of light;
   a reflector;
   a light opening positioned in the field of light;
   a mirror device arranged for reflecting a part of the field of light back towards the reflector, the part of the field of light being reflected a second time off the reflector and thereafter being directed through the light opening; and
   a prism arranged in the light opening for closing the opening against moisture and contaminants and for reflecting and refracting departing light into a light flow directed substantially along the a runway.

2. A light fitting adapted to be located below the surface of a runway, comprising:
   a light source;
   a reflector positioned to reflect light from the light source and having a first side and a second side, the first side reflecting a first portion of the light from the light source;
   a light opening;
   a mirror device positioned to receive the first portion of light reflected by the first side of the reflector, the mirror device being configured to reflect the first portion of light back toward the first side of the reflector so that the first portion of light is reflected a second time off the first side, the first portion of light being reflected the second time off the first side toward the second side and thereafter being reflected off the second side toward the light opening; and
   a prism arranged in the light opening for closing the opening against moisture and contaminants and for reflecting and refracting departing light into a light flow directed substantially along a runway.

3. The fitting as claimed in claim 2, wherein:
the light source and the reflector are assembled to a unit.

4. The fitting as claimed in claim 2, wherein:
the light source is a halogen lamp.

* * * * *